(12) United States Patent
Higure

(10) Patent No.: US 7,333,573 B2
(45) Date of Patent: Feb. 19, 2008

(54) RADIO COMMUNICATION APPARATUS AND METHOD HAVING AUTOMATIC FREQUENCY CONTROL FUNCTION

(75) Inventor: Kinichi Higure, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 758 days.

(21) Appl. No.: 10/644,951

(22) Filed: Aug. 21, 2003

(65) Prior Publication Data

US 2004/0037376 A1 Feb. 26, 2004

(30) Foreign Application Priority Data

Aug. 23, 2002 (JP) ............... 2002-242983

(51) Int. Cl.
*H04L 27/06* (2006.01)
(52) U.S. Cl. ................... 375/344; 455/192.2
(58) Field of Classification Search ........... 375/344, 375/362, 340, 224; 331/1 R; 455/136, 164.1, 455/173.1, 182.2, 192.2, 182.1, 192.1
See application file for complete search history.

(56) References Cited

U.S. PATENT DOCUMENTS

| | | | | |
|---|---|---|---|---|
| 5,282,227 A * | 1/1994 | Crawford | ............... | 375/327 |
| 6,631,174 B1 * | 10/2003 | Asahara et al. | ............... | 375/344 |
| 6,778,613 B2 * | 8/2004 | Avidor et al. | ............... | 375/329 |
| 6,816,716 B2 * | 11/2004 | Shohara | ............... | 455/196.1 |
| 6,985,705 B2 * | 1/2006 | Shohara | ............... | 455/164.1 |
| 6,993,094 B1 * | 1/2006 | Eberlein et al. | ............... | 375/326 |
| 7,079,605 B1 * | 7/2006 | Isaksen et al. | ............... | 375/344 |
| 2003/0026361 A1 * | 2/2003 | Talwalkar et al. | ............... | 375/344 |
| 2003/0087617 A1 * | 5/2003 | Shohara | ............... | 455/192.2 |

FOREIGN PATENT DOCUMENTS

| | | |
|---|---|---|
| JP | 6232936 | 8/1994 |
| JP | 07297779 | 11/1995 |
| JP | 832507 | 2/1996 |
| JP | 9233143 | 9/1997 |
| JP | 09246916 | 9/1997 |
| JP | 11308157 | 11/1999 |
| JP | 2000286910 | 10/2000 |
| JP | 2000324080 | 11/2000 |
| JP | 2001177436 | 6/2001 |
| JP | 200244176 | 2/2002 |

* cited by examiner

*Primary Examiner*—Jean B. Corrielus
(74) *Attorney, Agent, or Firm*—Mattingly, Stanger, Malur & Brundidge, P.C.

(57) ABSTRACT

A method for use in an apparatus for frequency error detection and automatic frequency control detects a frequency error by utilizing known symbols other than a data signal contained in an input signal. At least two known symbols located at positions somewhat distant from each other in the input signal are extracted therefrom. A phase shift between the two known symbols in the input signal represents a frequency shift of the input signal. The frequency shift of the input signal is detected from the phase shift. A first symbol set including at least two known different symbols and a second symbol set including at least two known symbols having a different symbol distance from that of the first symbol set are extracted.

22 Claims, 12 Drawing Sheets

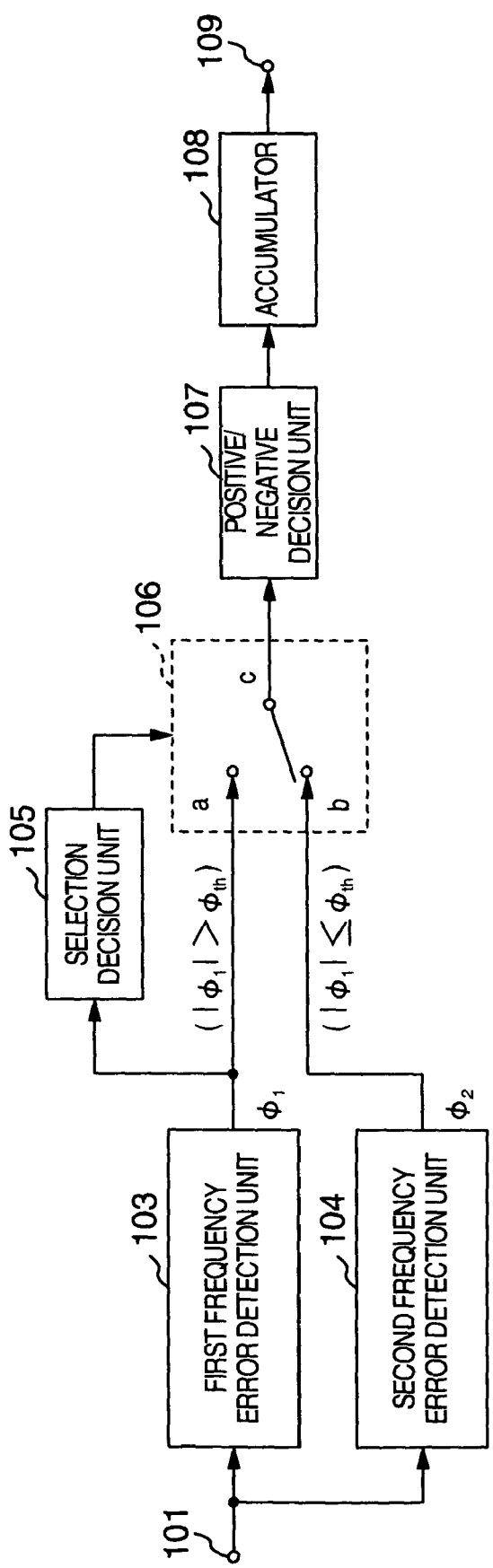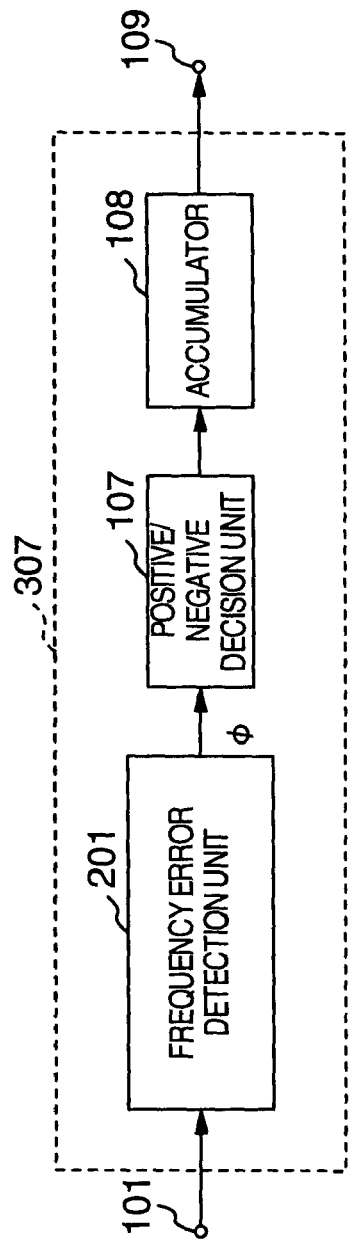

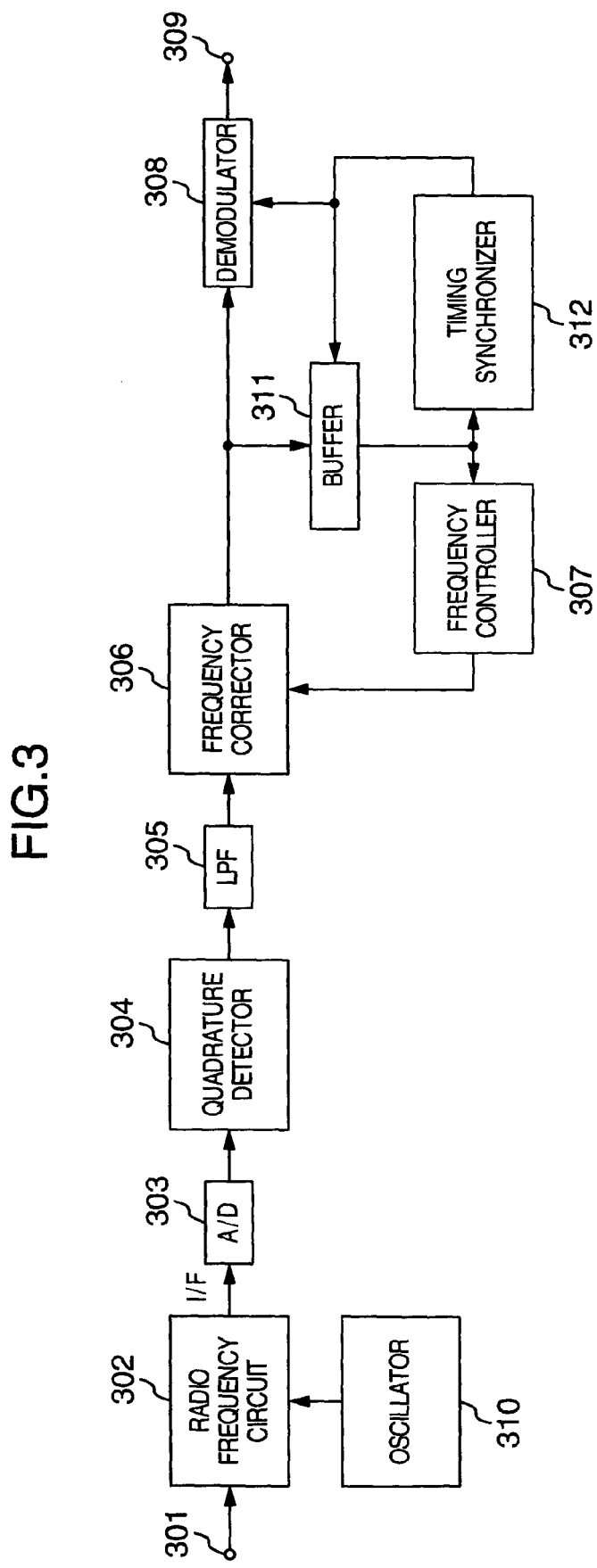

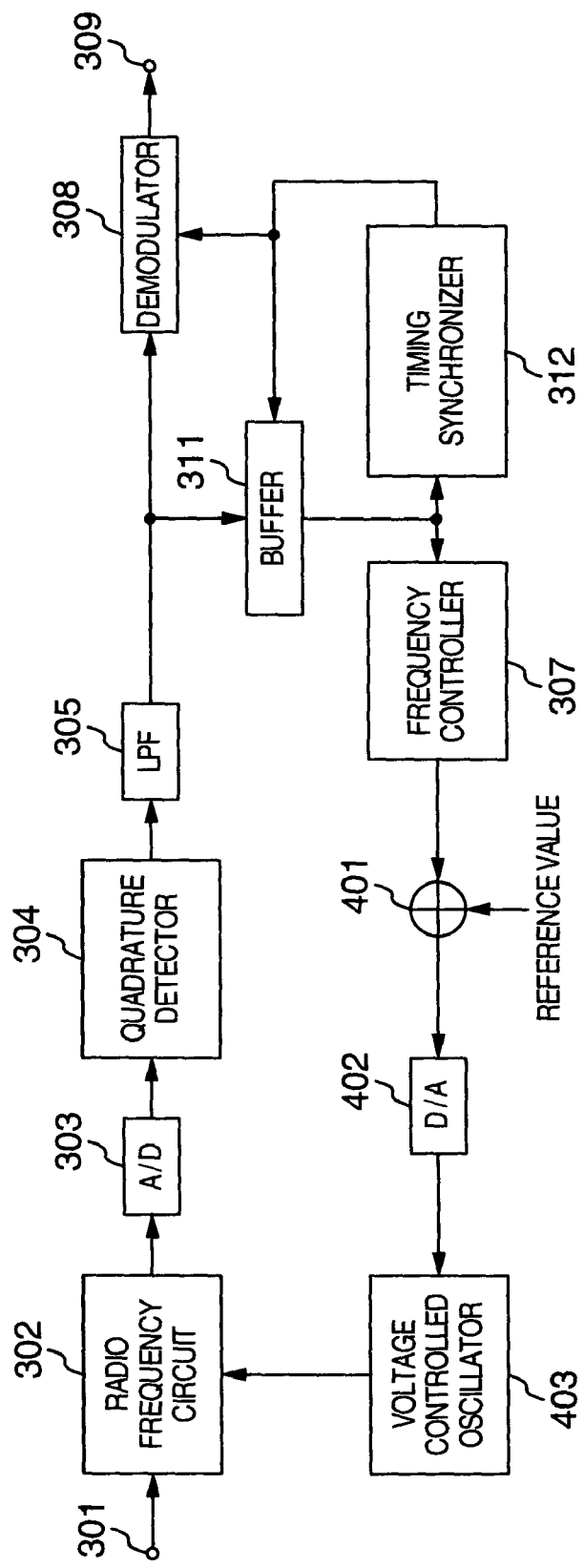

$s_1$: 1st SYMBOL OF SYNCHRONOUS WORD SYMBOL $s_9$: 9-th SYMBOL OF SYNCHRONOUS WORD SYMBOL $s_1$: SYMBOL PATTERN OF SYNCHRONOUS WORD 1st SYMBOL $s_{2-9}$: SYMBOL PATTERN OF ONE OF SYNCHRONOUS WORD 2-nd TO 9-th SYMBOLS

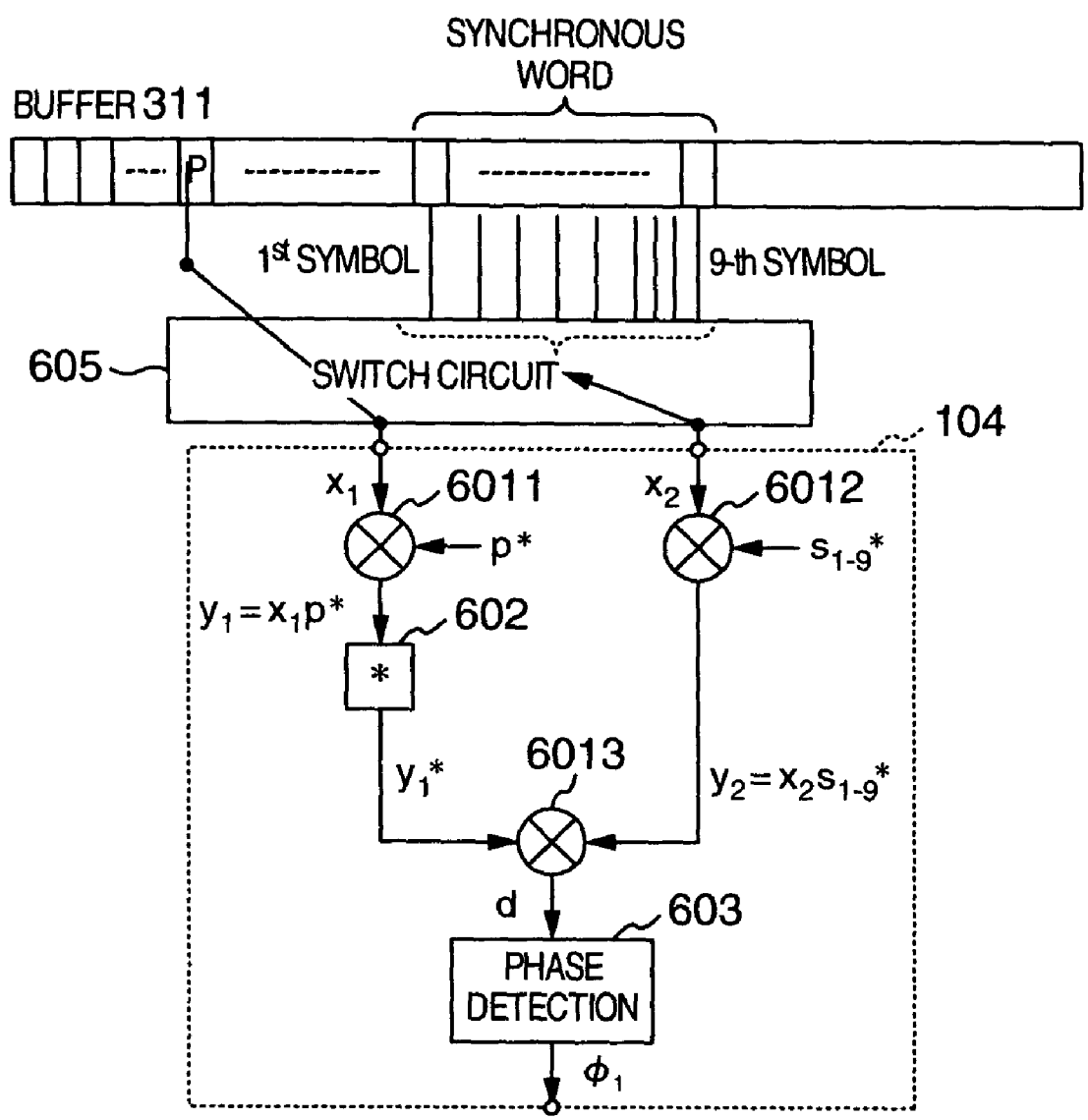

PHASE RELATION BETWEEN $x_1$ AND $s_1$

PHASE RELATION BETWEEN $x_2$ AND $s_9$ $\theta_1$ = PHASE DIFFERENCE BETWEEN $s_1$ AND $x_1$ CALCULATION OF $y_1$ $\theta_2$ = PHASE DIFFERENCE BETWEEN $s_9$ AND $x_2$ CALCULATION OF $y_1$ CALCULATION OF d

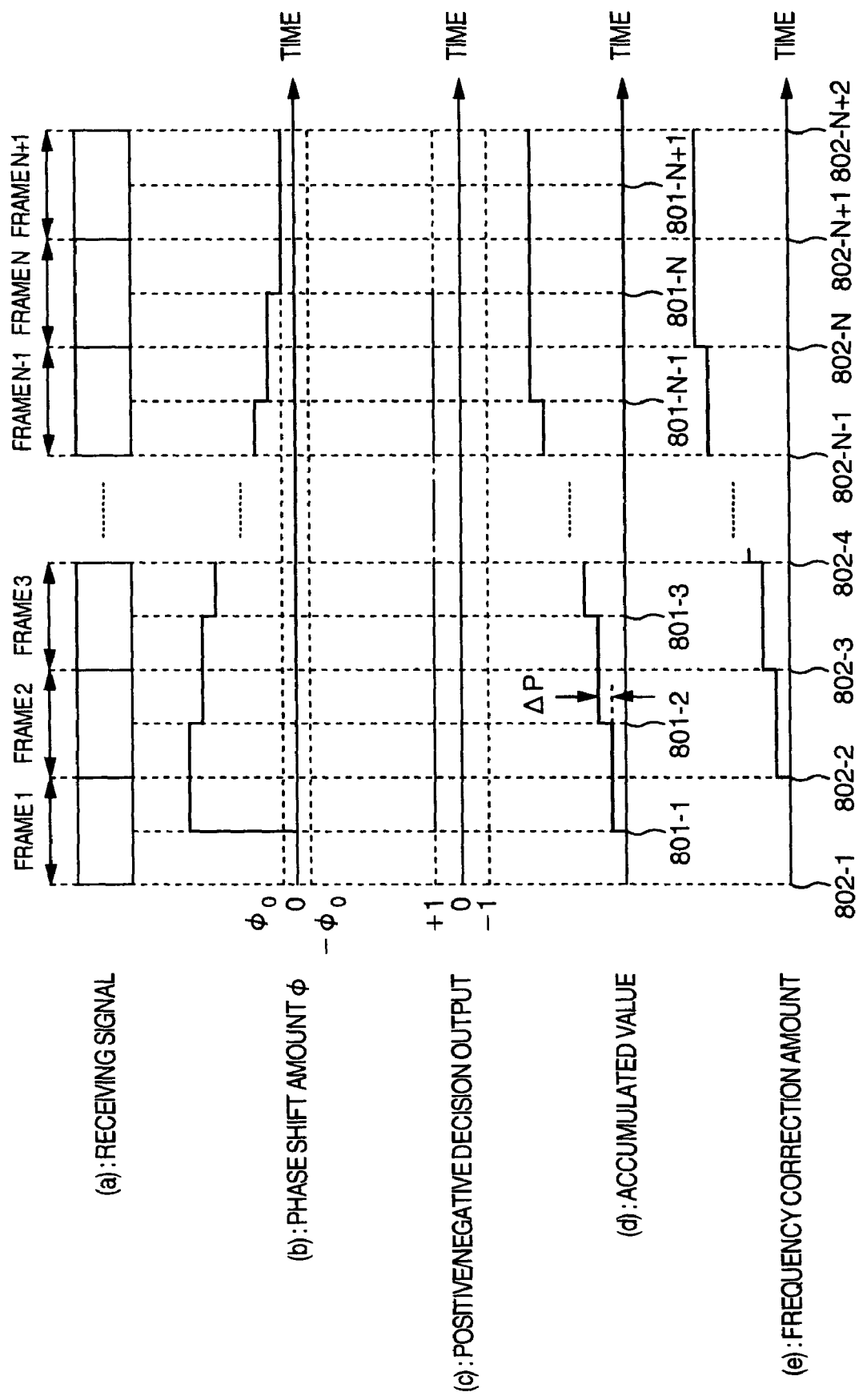

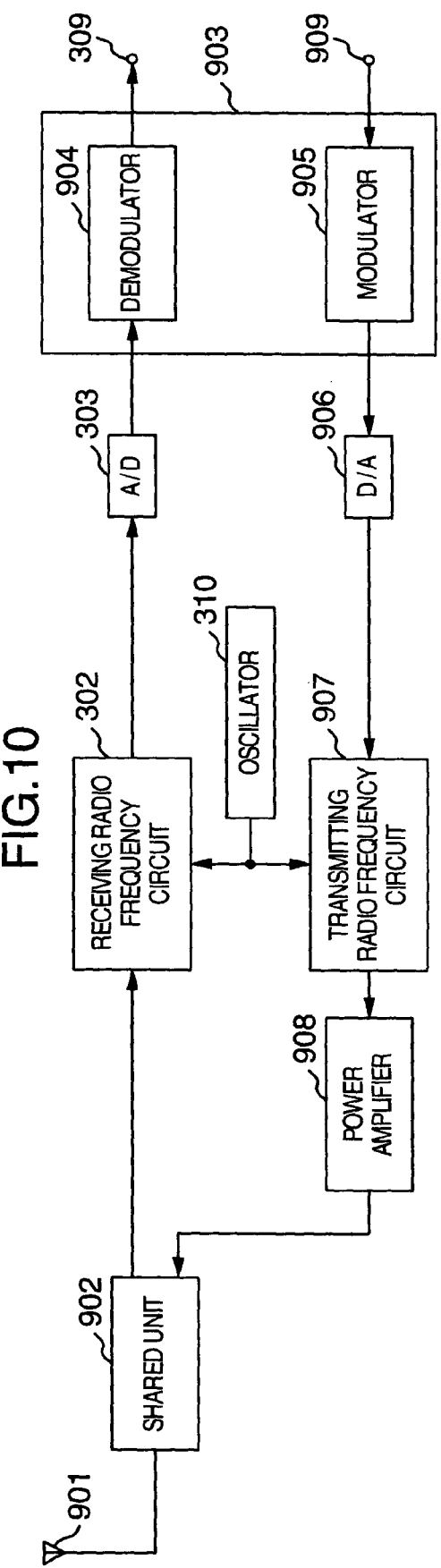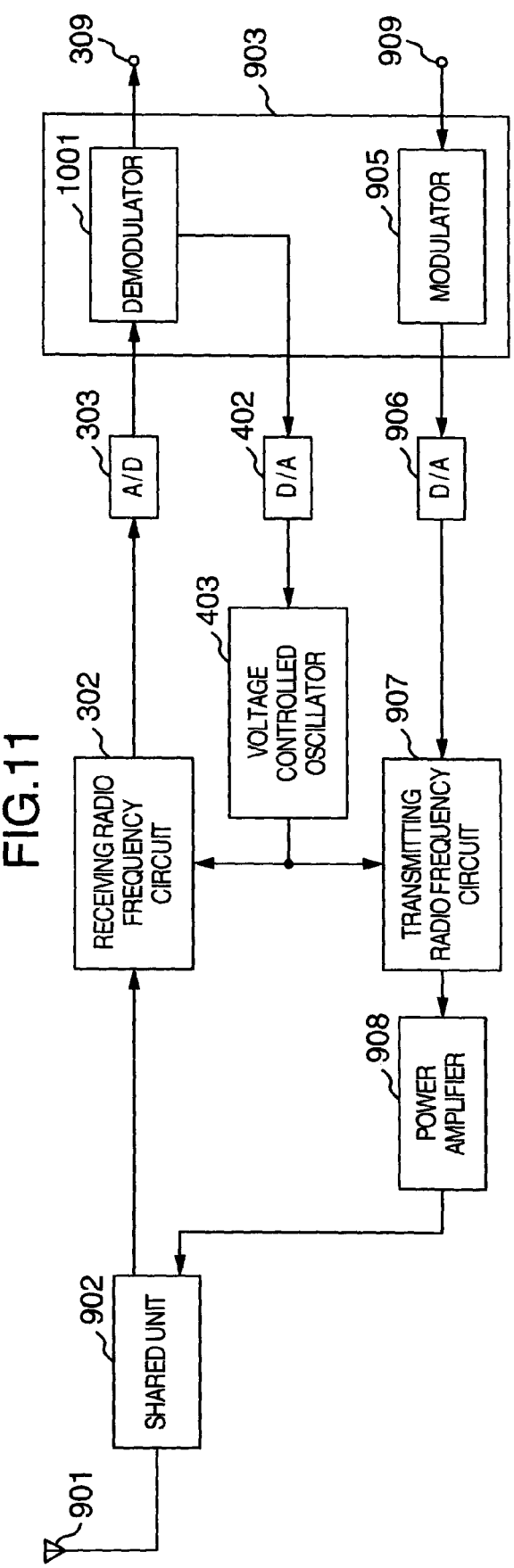

RADIO COMMUNICATION APPARATUS AND METHOD HAVING AUTOMATIC FREQUENCY CONTROL FUNCTION

BACKGROUND OF THE INVENTION

The present invention relates to automatic frequency control methods in digital receivers and more particularly, to an automatic frequency control method applicable to even a digital receiver using a receiving signal of modulation type such as phase shift keying (PSK) or quadratic amplitude modulation (QAM).

In the receiver, an internal oscillator has an error in frequency and therefore, a detected signal suffers from a frequency error because of an error between a carrier wave frequency of a received signal and a frequency to be demodulated. Especially, in the digital receiver using the receiving signal of the PSK or QAM modulation type, a frequency error causes an error in demodulated data and hence, there is a need for automatic frequency control adapted to correct the frequency error.

Techniques for controlling frequency errors in radio communication apparatus are disclosed in JP-A-2000-324080, JP-A-9-246916, JP-A-11-308157 and JP-A-7-297779. Any of the conventional frequency error control techniques in radio communication apparatus could not afford to perform a frequency error correction operation capable of rapidly and accurately converging the frequency to a correct frequency even in the event that frequency errors in a wide range take place in the receiving and transmitting apparatus.

SUMMARY OF THE INVENTION

It is an object of the invention to provide an apparatus capable of rapidly controlling the frequency correction for frequency errors in a wide range in a radio communication apparatus and a method for the same.

In frequency error detection and frequency control according to the invention, a frequency error is detected by utilizing known symbols other than a data signal contained in an input signal. At least two known symbols located at positions appreciably distant from each other in a frame of the input signal are extracted therefrom. If any frequency shift is not caused in the input signal, the two known distant symbols are in constant phase relation and do not suffer from a phase shift (phase rotation). Conversely, if a phase shift takes place between the two known distant symbols, there results the occurrence of a frequency shift. Accordingly, a phase shift between the two known symbols in the frame of the input signal represents a frequency shift in the input signal. If the phase shift can be detected, the frequency shift in the input signal can be known. By controlling the frequency of a reference frequency source of the receiving or transmitting apparatus in a direction in which the detected frequency shift can be made to be zero, the frequency error can be corrected.

When the distance or interval between the two known symbols is narrow, the wide range of frequency errors can be detected and the frequency can be converged to a target value at a high speed but the error correction accuracy is low. Conversely, with the distance between the two known symbols widened, the error detectable frequency range is small and the frequency is converged to a target value at a low speed but the error correction accuracy is high. Accordingly, by using the high-speed and low-accuracy error detection and the low-speed and high-accuracy error detection in combination, frequency correction control can be implemented which exhibits high speed and high accuracy in a wide range of frequency errors.

In the present invention, a first symbol set containing at least two known different symbols and a second symbol set containing at least two known symbols and having a different symbol distance from that of the first symbol set are extracted from an input signal. Then, a frequency error of the input signal is detected on the basis of the extracted first and second symbol sets so as to detect a first frequency error and a second frequency error and any one of the outputs of first and second frequency error detection units is made to be selectable as a frequency error control signal.

According to one embodiment of the invention, when the frame format of the input signal includes a known pilot signal, a data area of predetermined symbol length and a known synchronous word symbol area of predetermined symbol length, the first frequency error is detected on the basis of at least two synchronous word symbols in the synchronous word symbol area and the second frequency error is detected on the basis of the pilot signal and a single synchronous word symbol in the synchronous word symbol area.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing an embodiment of a circuit for generating a frequency control signal in a principal part of a digital receiver practicing an automatic frequency control method according to the invention.

FIG. 2 is a block diagram of an example of a circuit for generation of a frequency control signal.

FIG. 3 is a block diagram showing an example of construction of a receiver of a base station in a radio communication system to which the invention is applied.

FIG. 4 is a block diagram showing an example of construction of a receiver of a terminal station in the radio communication system to which the invention is applied.

FIG. 5 is a diagram showing an example of a frame format of a signal to be transmitted.

FIGS. 6A, 6B, 6C, 6D and 6E are block diagrams showing different embodiments of a frequency error detection circuit according to the invention, respectively.

FIG. 8 is a signal timing chart for explaining the frequency error detection method according to the invention.

FIG. 10 is a block diagram showing an embodiment of a base station radio apparatus to which the invention is applied.

FIG. 11 is a block diagram showing an embodiment of a terminal station radio apparatus to which the invention is applied.

DESCRIPTION OF THE EMBODIMENTS

Figure 6A:
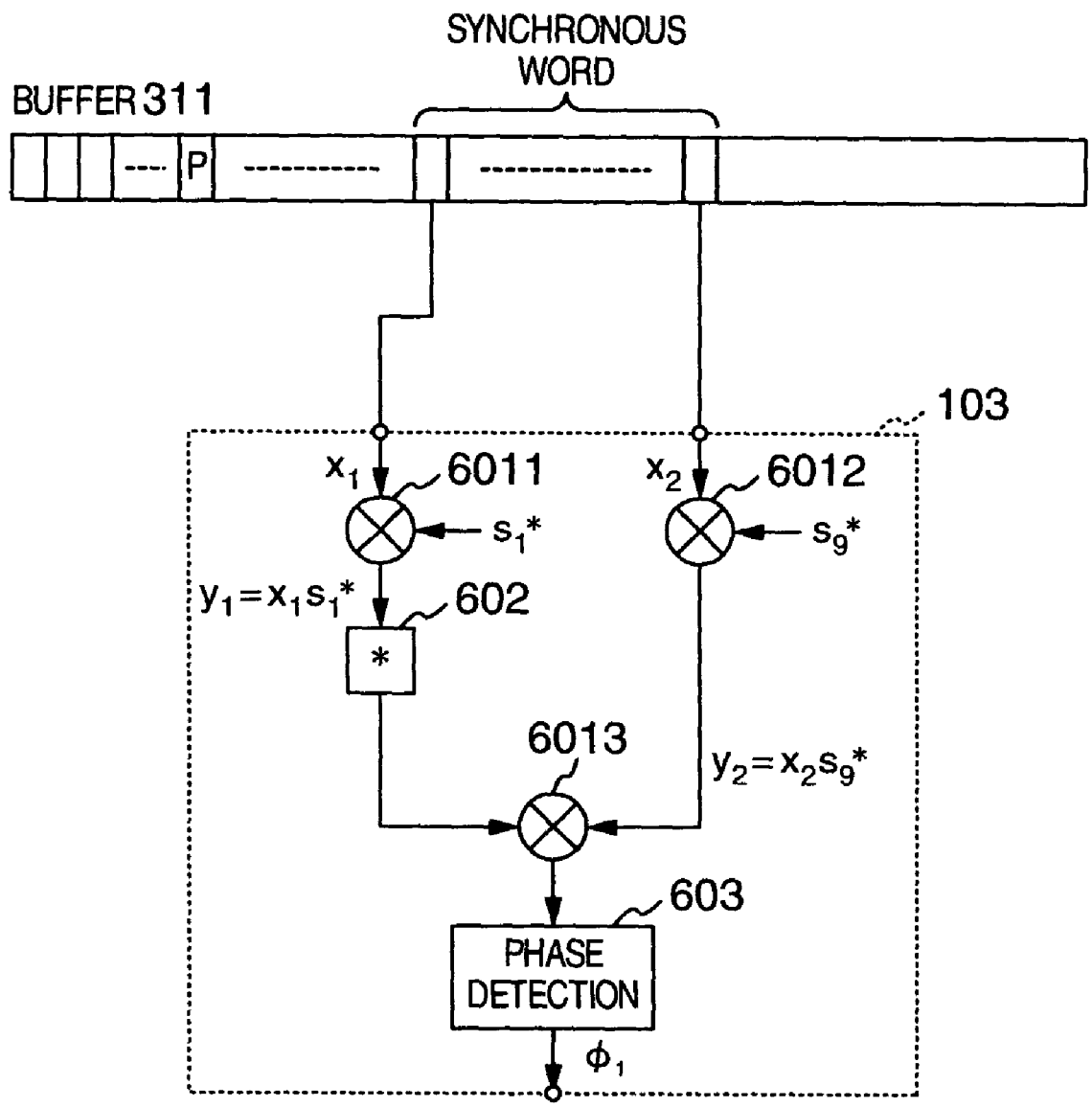

Different methods for frequency error correction are adapted to the base station receiver and the terminal station receiver and will be described separately hereinafter.

Referring first to FIG. 3 showing, in block diagram form, an example of construction of a base station receiver, an automatic frequency control method in the base station receiver will be described.

A signal received from an antenna is inputted to a receiving signal input terminal 301 and then inputted to a radio frequency circuit 302. The received signal is a high-frequency signal in a radio band and the radio frequency circuit 302 converts the frequency of the received signal into an intermediate frequency capable being sampled by means of an A/D converter 303 so that an intermediate frequency signal may be supplied to the A/D converter. An oscillator 310 delivers to the radio frequency circuit 302 a signal of a reference frequency which is used as a reference signal for the frequency conversion. The A/D converter 303 samples and quantizes the received signal subjected to the frequency conversion to convert it into a digital signal which in turn is inputted to a quadrature detector 304.

The quadrature detector 304 converts the signal of intermediate frequency supplied from the A/D converter 303 into a baseband signal and supplies it to a low-pass filter 305. The low-pass filter 305 has root roll-off characteristics and is adapted to eliminate unwanted frequency components from the received signal and then supply a resulting signal to a frequency corrector 306. The frequency corrector 306 corrects a frequency error due to an error of the oscillator 310 by using a frequency correction amount delivered out of a frequency controller 307 and supplies a corrected signal to a demodulator 308 and a buffer 311. The demodulator 308 demodulates the received signal by using timing information received from a timing synchronizer 312 and delivers a demodulated signal to a demodulated data output terminal 309.

The buffer 311 uses the timing information received from the timing synchronizer 312 to accumulate the output signal from the frequency corrector 310 starting with the head of frame of the output signal in a sequential order. The timing synchronizer 312 detects the position of a synchronous word from the signal accumulated in the buffer 311 to thereby calculate a delay time of the received signal and supplies this delay time as representing the timing information to the demodulator 308 and buffer 311. In the demodulator 308 and buffer 311, the timing information inputted from the timing synchronizer 312 is reflected upon processes of the next and ensuing frames.

The frequency controller 307 detects a frequency error from the accumulated signal in the buffer 311 and controls the frequency correction amount for the frequency corrector 306 by using the detected error.

Turning now to FIG. 4 showing, in block diagram form, an example of construction of a terminal station receiver, an automatic frequency control method in the terminal station receiver will be described.

In the block diagram of FIG. 4, the receiving signal input terminal 301, radio frequency circuit 302, A/D converter 303, quadrature detector 304 and low-pass filter 305 are constructed identically to those of FIG. 3. The output of the low-pass filter 305 is delivered to a demodulator 308 and a buffer 311. The demodulator 308 demodulates a received signal by using timing information inputted from a timing synchronizer 312 and delivers a demodulated signal to a demodulation data output terminal 309.

The buffer 311 uses the timing information supplied from the timing synchronizer 312 to accumulate the output signal of low-pass filter 305 in order starting with the head of frame. The timing synchronizer 312 detects a timing from the signal accumulated in the buffer 311 and delivers timing information to the demodulator 308 and buffer 311.

A frequency controller 307 detects a frequency error from the signal accumulated in the buffer 311 and uses the detected error to control the control voltage of a voltage controlled oscillator 403 through adder 401 and D/A converter 402. The adder 401 adds a reference value to the error calculated by the frequency controller 307 and delivers a sum signal to the D/A converter 402. The D/A converter 402 converts the digital value received from the adder 401 to an analog voltage which in turn is supplied to the voltage controlled oscillator 403.

In this manner, the oscillation frequency of the voltage controlled oscillator 403 is controlled and a frequency-controlled reference signal is applied to the radio frequency circuit 302, which in turn makes frequency error correction.

Prior to explaining the frequency control unit 307, the frame format of a receiving signal will be described with reference to FIG. 5.

In the digital radio communication system, a transmitting signal consists of a plurality frames each having a constant time interval. Depicted in FIG. 5 is an example of the frame format of a receiving signal. A ramp section (R) is a run-up section in which a gradual rise from a non-signal status takes place and typically, about 3 to 4 symbols are provided. A pilot symbol (P) is a known reference symbol for demodulation of a data area signal, having one symbol lying before, after or intermediately of the data area signal. In the example of FIG. 5, one symbol is provided on either side of data area signals. A synchronous word (SW) is a known symbol for performing frame synchronization and typically, about 10 to 20 symbols are provided. A guard time (G) is a section for preventing interference between frames and no information is contained in this section. This section also serves as a section for ramp down in which a gradual fall to the non-signal status takes place and about 5 to 19 symbols are provided including 3 to 4 symbols for ramp down.

Returning to FIG. 2, details of the frequency controller 307 will be described.

The signal accumulated in the buffer 311 of FIG. 3 or 4 is inputted to a frequency error detection unit 201 through an input terminal 101. An example of the frequency error detection unit 201 is detailed in block form in FIG. 6A. Signals to be operated in respective blocks of the frequency error detection unit 201 are illustrated in the form of vectors in FIGS. 7A, 7B, 7C, 7D and 7E where ordinate represents Q component and abscissa represents I component. Operation of the frequency error detection unit 201 will be described by making reference to FIG. 6A and FIGS. 7A, 7B, 7C, 7D and 7E.

A complex multiplier 6011 calculates a complex product $y_1 = x_1 s_1^*$ of the first symbol (assumed to be $x_1$) of synchronous word area of the signal accumulated in the buffer 311 and a complex conjugate $s_1^*$ of symbol pattern $s_1$ of the synchronous word first symbol and delivers a calculation result to a complex conjugate calculation circuit 602. Here, the complex conjugate means inversion between positive and negative of imaginary part and a complex conjugate of, for example, $a = a_r + ja_i$ (where $a_r$ and $a_i$ are real numbers and j is the imaginary unit being $j=\sqrt{(-1)}$) is $a^* = a_r - ja_i$.

Calculation of $y_1$ is carried out to detect how much the phase of $x_1$ of buffer 311 is rotated with respect to the symbol pattern $s_1$. To explain this calculation with reference to FIGS. 7A and 7C, where the phase of $x_1$ is $\theta_{x1}$ and the phase of $s_1$ is $\theta_{s1}$ (see FIG. 7A), the phase of $s_1^*$ is $-\theta_{s1}$ and phase $\theta_1$ of $y_1 = x_1 s_1^*$ is $\theta_1 = \theta_{x1} + (-\theta_{s1})$, indicating that the phase $\theta_1$ of $y_1$ represents the phase difference between $x_1$ and $s_1$.

A complex multiplier 6012 calculates a complex product $y_2=x_2 s_9^*$ of the ninth symbol (assumed to be $x_2$) of synchronous word area of the signal accumulated in the buffer 311 and a complex conjugate $s_9^*$ of symbol pattern $s_9$ of the synchronous word ninth symbol and delivers the product to a complex multiplier 6013.

Figure 7A:
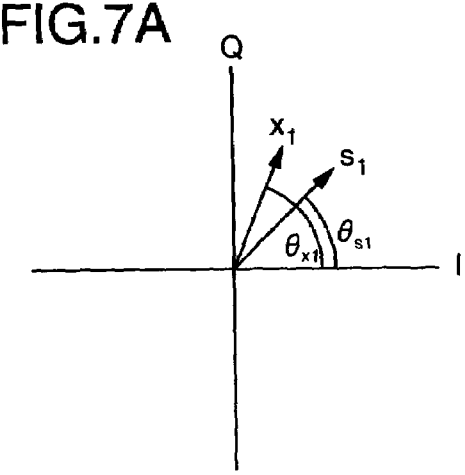
FIGS. 7A, 7B, 7C, 7D and 7E are graphical representations showing I-Q coordinates useful to explain a frequency error detection method according to the invention.
Figure 7B:
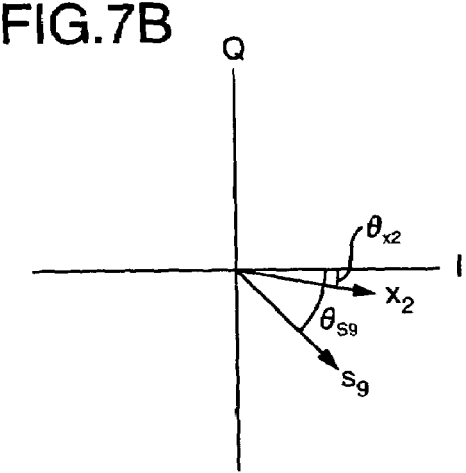
Figure 7C:
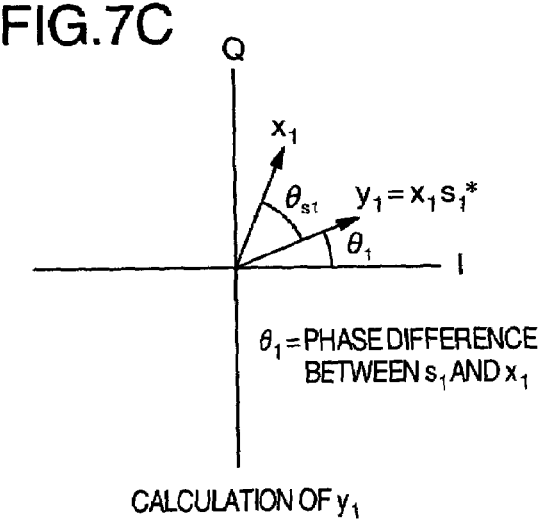
Figure 7D:
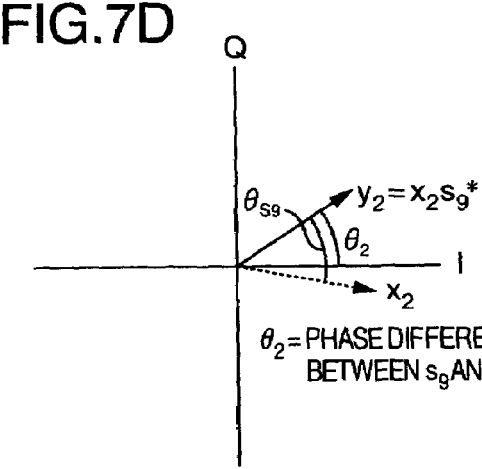

The calculation of $y_2$ is depicted in vector diagrams of FIGS. 7B and 7D, indicating phase $\theta_2$ of $y_2$ represents the phase difference between $x_2$ and $s_9$.

The complex calculation circuit 602 calculates a complex conjugate of $y_1$ delivered out of the complex multiplier 6011 and supplies a calculation result to the complex multiplier 6013.

The complex multiplier 6013 calculates a complex product $d=y_2 y_1^*$ of $y_2$ representing the output of the complex multiplier 6012 and $y_1^*$ representing the output of the complex conjugate calculation circuit 602 and supplies a calculation result to a phase detection circuit 603.

Figure 7E:
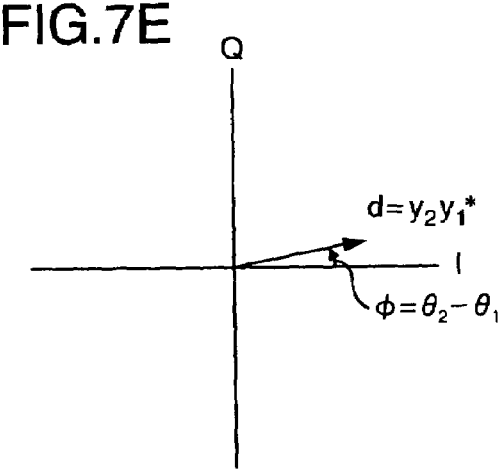

To explain the calculation of d with reference to a vector diagram of FIG. 7E, where the phase of $y_2$ is $\theta_2$ and the phase of $y_1^*$ is $-\theta_1$, phase $\phi$ of d is $\phi=\theta_2+(-\theta_1)$, indicating that the phase $\phi$ represents the phase difference between $y_1^*$ and $y_2$.

When no frequency error occurs in the receiving signal, the above $\theta_1$ and $\theta_2$ satisfy $\theta_1=\theta_2$ but a frequency error takes place in the receiving signal, the phase of the receiving signal rotates by a constant angle every unit time to cause a phase difference between $\theta_1$ and $\theta_2$, which phase difference is proportional to the frequency error.

The phase detection circuit 603 detects the phase $\phi$ of d delivered out of the complex multiplier 6013 to supply the phase $\phi$ ($\phi_1$ in FIG. 6A) to a positive/negative decision circuit 107 of FIG. 2.

The positive/negative decision unit 107 decides positive/negative of the phase shift amount $\phi$ detected by the frequency error detection unit 201 to deliver to an accumulator 108 "+1" if $\phi>\phi_0$, "−1" if $\phi<-\phi_0$ and "0" if $|\phi|\leq\phi_0$, where $\phi_0$ is 0 or a positive constant.

The accumulator 108 incorporates a memory for holding the output value and is reset to "0" during making time of power supply. The accumulator 108 adds a value $\Delta P$ to the value of the internal memory when "+1" is inputted from the positive/negative decision unit 107, subtracts the value $\Delta P$ from the value of the internal memory when "−1" is inputted and keeps the value of the internal memory intact when "0" is inputted. Subsequently, the value of the internal memory is supplied to the frequency corrector 306 of FIG. 3 or the adder 401 of FIG. 4. The value $\Delta P$ is a constant to be added to or subtracted from the internal memory and is set in compliance with a desired convergent speed.

Referring now to FIG. 8, the method for frequency error detection and frequency control signal generation will be described in greater detail. A timing chart of FIG. 8 illustrates output signals of frequency error detection unit 201, positive/negative decision unit 107 and accumulator 108, respectively, indicating at (a) a receiving signal, at (b) an output value of phase shift amount $\phi$ of frequency error detection unit 201, at (c) a positive/negative decision value delivered from the positive/negative decision unit 107 to the accumulator 108, at (d) an integrated value inside the accumulator 108 and at (e) a frequency correction amount inputted to the frequency corrector 306 of FIG. 3 or the adder 401 of FIG. 4.

Since the phase shift amount $\phi$ at (b), the positive/negative decision output at (c) and the integrated value at (d) are calculated immediately after the synchronous word in the center of the frame is inputted, the individual values at (b) to (d) are delivered at timings 801-1, 801-2, ... 801-N−1, 801-N and 801-N+1. N is a positive integer number.

FIG. 8 shows a case where the frequency error is positive. The phase shift amount $\phi$ at (b) detected at timing 801-1 in frame 1 is $\phi>\phi_0$ and as a result, the positive/negative decision output at (c) is +1, and +$\Delta P$ is added to the integrated value at (d). The integrated value at (d) is reflected upon the frequency correction amount at (e) at timing 802-2 coincident with the head of the next frame, so that the frequency of the receiving signal is corrected. The frequency correction herein is carried out so as not to correct the detected error at a time and consequently, the frequency error still remains at timing 802-1 and the detection of phase shift amount $\phi$, positive/negative decision, integration and correction are repeated through frame 2, frame 3 . . . .

At timing 801-N in frame N, the detection value of phase shift amount $\phi$ satisfies $\phi=\phi_0$, with the result that the positive/negative decision output at (c) becomes 0, the integrated value at (d) converges and the frequency correction amount at (e) also converges at frame N and ensuing frames. In the frequency error detection unit 201, the frequency error is detected on the basis of the phase shift amount between two known symbols and therefore the detectable range is such a range that the absolute value $|\phi|$ of phase shift amount $\phi$ between the two symbols used is not greater than 180 degrees.

For example, when in a radio system having a radio frequency of 60 MHz and a symbol rate of 11.25 kHz, the permissible frequency shift is ±3 ppm, a maximum frequency error of ±360 Hz is conceivable (if there are a shift ±3 ppm on the transmitting side and a shift ±3 ppm on the receiving side, the maximum shift is ±6 ppm=±360 Hz) and with the frame format of FIG. 5, two symbols of the synchronous word (SW), for example, the first symbol and the ninth symbol (an interval therebetween is 8 symbols) are used to permit detection of the maximum phase shift 180°, that is, up to a maximum frequency shift of 11.25 kHz× (180°/360°)/8 symbols=703 Hz.

The input signal is affected by distortion due to a group delay of the filter inside the radio frequency circuit and a multi-path of propagation path so as to cause the receiving signal to contain distortion. For example, if an error of 5° is contained in a detected phase shift amount $\phi$ owing to that distortion (detected in terms of a phase shift amount between 8 symbols), an error of 11.25 kHz×(5°/360°)/8 symbols=19.5 Hz is caused in frequency error correction.

In the case of a receiving signal of π/4 shift QPSK modulation type, demodulation is carried out on the basis of the phase difference from the preceding symbol and with the aforementioned frequency error, an error of 5°/8 symbols=0.625° per symbol is caused which affects substantially negligibly.

But, when the automatic frequency control is applied through the method set forth so far to the digital receiver using a receiving signal of PSK or QAM modulation type, the absolute phase (in the case of QAM, both the absolute phase and the absolute amplitude) is needed and in the presence of the aforementioned error, the phase is rotated, for example, by 0.625°×64 symbols=40° during demodulation of a data area signal of 64 symbols, with the result that the sign decision sometimes becomes erroneous and demodulation fails to proceed.

An embodiment of frequency control according to the invention effective to solve the problem as above will be detailed hereunder.

Returning to FIG. 1, there is illustrated, in block diagram form, an embodiment of the frequency controller forming a principal part of the digital receiver practicing the automatic frequency control method according to the invention.

In FIG. 1, a first frequency error detection unit 103 detects a phase shift amount $\phi_1$ between two symbols (for example, the first symbol and the ninth symbol) of synchronous word from the buffer 311 of FIGS. 3 or 4 and supplies it to a terminal a of switch 106 and a selection decision unit 105.

A second frequency error detection unit 104, on the other hand, detects a phase shift amount $\phi_2$ between a pilot symbol and one symbol of synchronous word (for example, a pilot symbol immediately after the ramp section and the first symbol of synchronous word) from the buffer 311 of FIG. 3 or 4 and delivers it to a terminal b of the switch 106.

For example, as the first frequency error detection unit 103, the circuit described previously in connection with FIG. 6A can be utilized. Also, the circuit shown in FIG. 6B can be used as the second frequency error detection unit 104. The FIG. 6B circuit differs from the FIG. 6A circuit in that the input signal consists of the pilot signal and the first symbol of synchronous word symbol area, with its operation being essentially identical to that of FIG. 6A circuit and not being described herein.

Figure 6B:
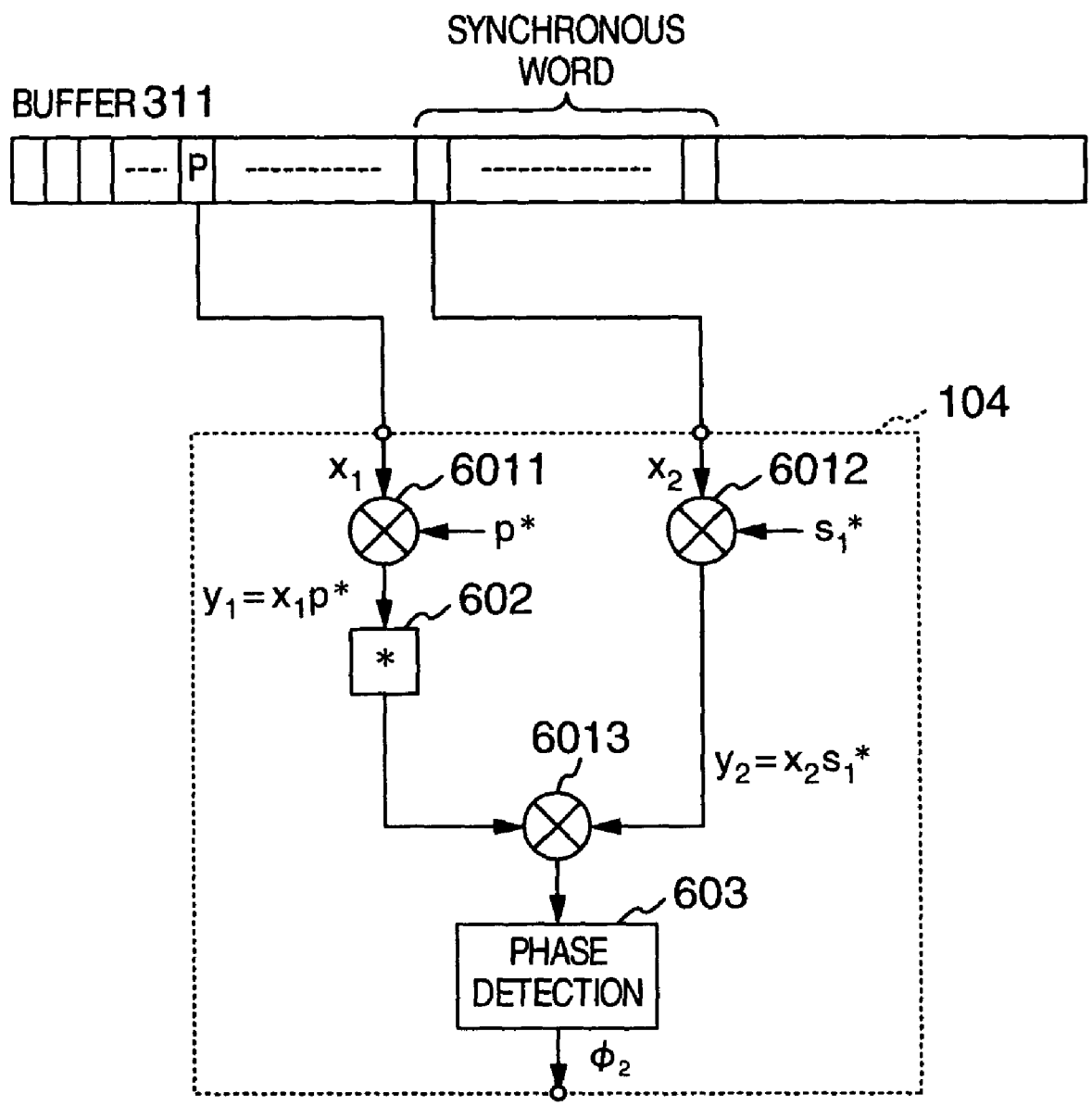

In case two symbols $x_1$ and $x_2$ of the input to each of the frequency error detection units of FIGS. 6A and 6B are distant from each other by n symbols (n: integer number), the value n may preferably be selected to the power of 2 to facilitate the circuit design.

The selection decision unit 105 compares an absolute value $|\phi_1|$ of the output value $\phi_1$ of first frequency error detection unit 103 with a preset positive integer $\phi_{th}$ to control the switch 106 such that terminals b and c of the switch 106 are connected to each other when $|\phi_1| \leq \phi_{th}$ stands but the terminals a and c are connected together when $|\phi_1| > \phi_{th}$ stands.

The switch 106 follows the control by the selection decision unit 105 to deliver to the positive/negative decision unit 107 any one of the output value $\phi_1$ of first frequency error detection unit. 103 and the output value $\phi_2$ of second frequency error detection unit 104.

Operation of the accumulator 108 is the same as that explained in connection with FIG. 2 and its description will be omitted herein.

The preset positive constant $\phi_{th}$ is a threshold value for switching between the output value $\phi_1$ of first frequency error detection unit 103 and the output value $\phi_2$ of second frequency error detection unit 104 and is selected to be a value smaller than an absolute value of output value $\phi_1$ detected by the first frequency error detection unit 103 and corresponding to a maximum frequency error detectable by the second frequency error detection unit 104. In other words, the frequency error is detected with the second frequency error detection unit 104 as far as possible and if impossible, the frequency error detection is carried out with the first frequency error detection unit 103.

For example, where, in FIG. 5, the first half of data area signal is of 63 symbols, the first symbol and ninth symbol in synchronous word are used for phase shift amount detection in the first frequency error detection unit 103 (detection of a phase shift amount over 8 symbols) and a pilot symbol immediately after the ramp section and the first symbol of synchronous word are used for phase shift amount detection in the second frequency error detection unit 104 (detection of a phase shift amount over 64 symbols), the maximum frequency error detectable with the second frequency error detection unit 104 is 11.25 kHz×(180°/360°)/64 symbols=87.9 Hz and at that time, the detection value of $\phi_1$ in the first frequency error detection unit 103 is 180°×(8 symbols/ 64 symbols)=22.5°. Then, with a view to preventing erroneous operations, the $\phi_{th}$ is assigned with a value smaller than 22.5°, for example, half of the value amounting to 11.25°. In other words, when the frequency error is smaller than 43.9 Hz, automatic frequency control is carried out with the second frequency error detection unit 104 and in other cases, automatic frequency control is performed with the first frequency error detection unit 103.

Immediately after the start of operation, the frequency error is large and so the first frequency error detection unit 103 is used for control but when the frequency error converges to within $\phi_{th}$, switching to the second frequency error detection unit 104 is done to permit highly accurate and rapid frequency control.

In this manner, even in the presence of distortion in the input signal, the frequency control can be performed using the second frequency error detection unit 104 eventually unless an error of $\phi_1$ due to distortion exceeds $\phi_{th}$ and as a result, the error in frequency control due to distortion can be alleviated. For example, when the input signal has an error of 5° in phase, an error detected by the second frequency error detection unit 104 is 11.25 kHz×(5°/360°)/64 symbols=2.44 Hz and the phase shift amount during demodulation of the first half of data area amounts to 5°.

Accordingly, the present embodiment can be applicable to the digital receiver of PSK or QAM modulation type for performing demodulation by using the absolute phase (or both the absolute phase and the absolute amplitude) so as to permit demodulation.

As described above, by performing the automatic frequency control through the use of the second frequency error detection unit of high detection accuracy when the frequency error detection value is small and through the use of the first frequency error detection unit 103 of broad detection range in other cases, the frequency control can be done for a wide range of frequency errors and at the same time errors in frequency can be mitigated.

Referring now to FIGS. 6C, 6D and 6E and FIG. 9, another embodiment of the frequency error detection unit previously described by making reference to FIGS. 6A and 6B will be described.

Figure 6C:
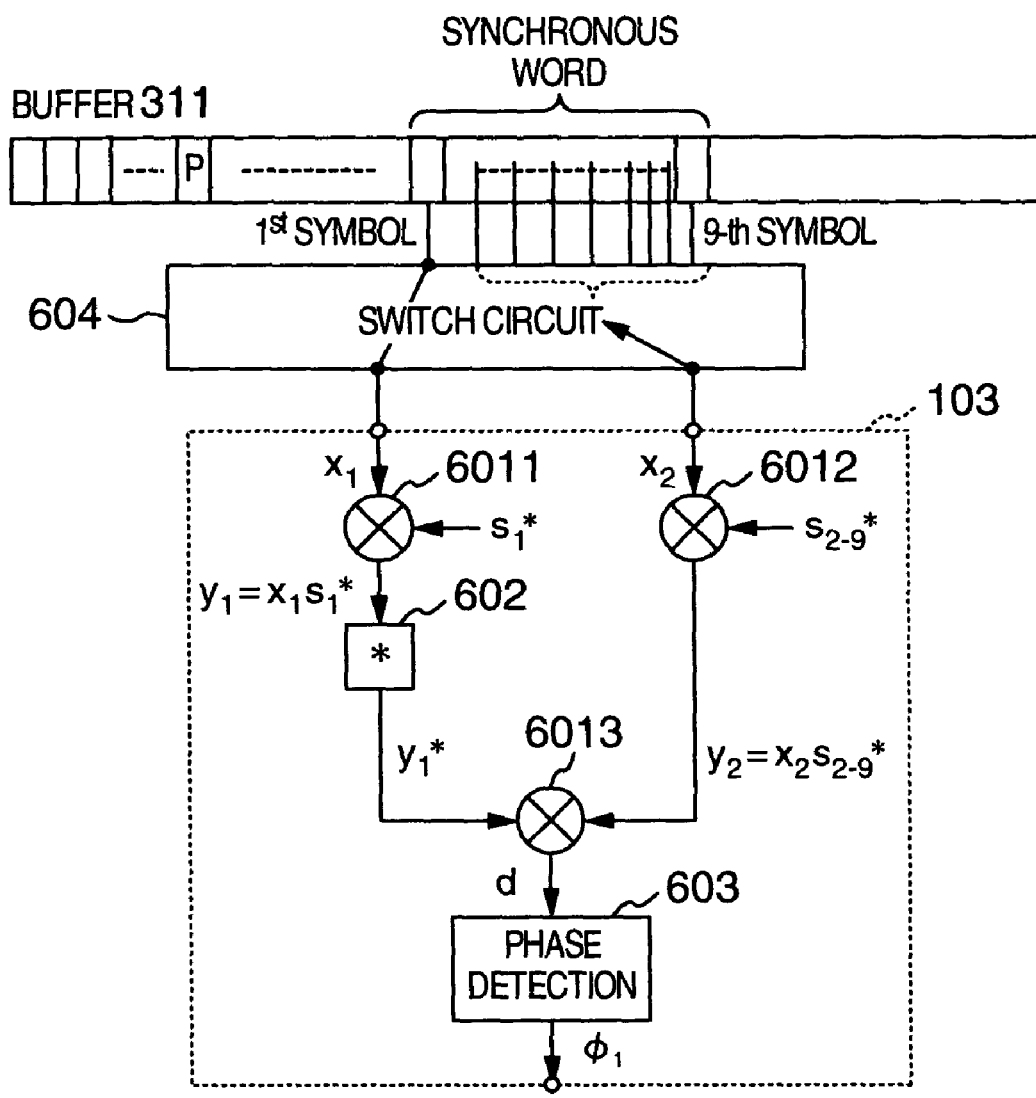

An example of internal construction of the first frequency error detection unit 103 in FIG. 1 is illustrated in FIG. 6C. The internal construction and operation of a block 103 in FIG. 6C are the same as those in FIG. 6A and will not be described herein. The frequency error detection unit of FIG. 6C differs from FIG. 6A in that a switch unit 604 for selection of synchronous word symbol is interposed between the buffer 311 and the input of frequency error detection unit 103. The switch unit 604 can select two desired synchronous words of synchronous word symbol area. Accordingly, by desirably selecting the symbol interval or distance between two input synchronous word symbols $x_1$ and $x_2$ by means of the switch unit 604, the detection accuracy and frequency correction speed of first frequency error detection unit 103 can be set to suitable values the user desires.

FIG. 6D shows an example of internal construction of the second frequency error detection unit 104 shown in FIG. 1. The internal construction and operation of a block 104 are the same as those in FIG. 6B and will not be described herein. The frequency error detection unit of FIG. 6D differs from FIG. 6B in that a switch unit 605 for selection of synchronous word symbol is interposed between the buffer 311 and the input of frequency error detection unit 104. The switch unit 605 can select one desired synchronous word of synchronous word symbol area. Accordingly, by desirably selecting the symbol distance between two input synchronous word symbols $x_1$ and $x_2$ by means of the switch unit 605, the detection accuracy and frequency correction speed can be set to suitable values the user desires.

Figure 6E:
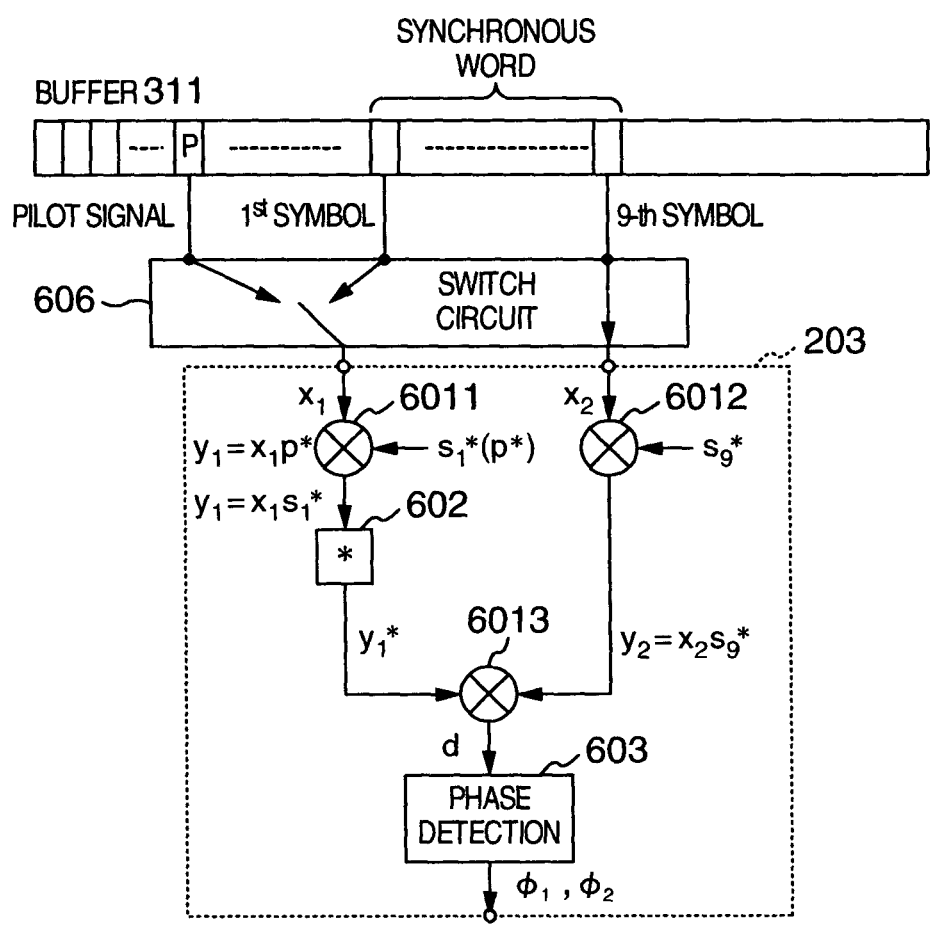
Figure 9:
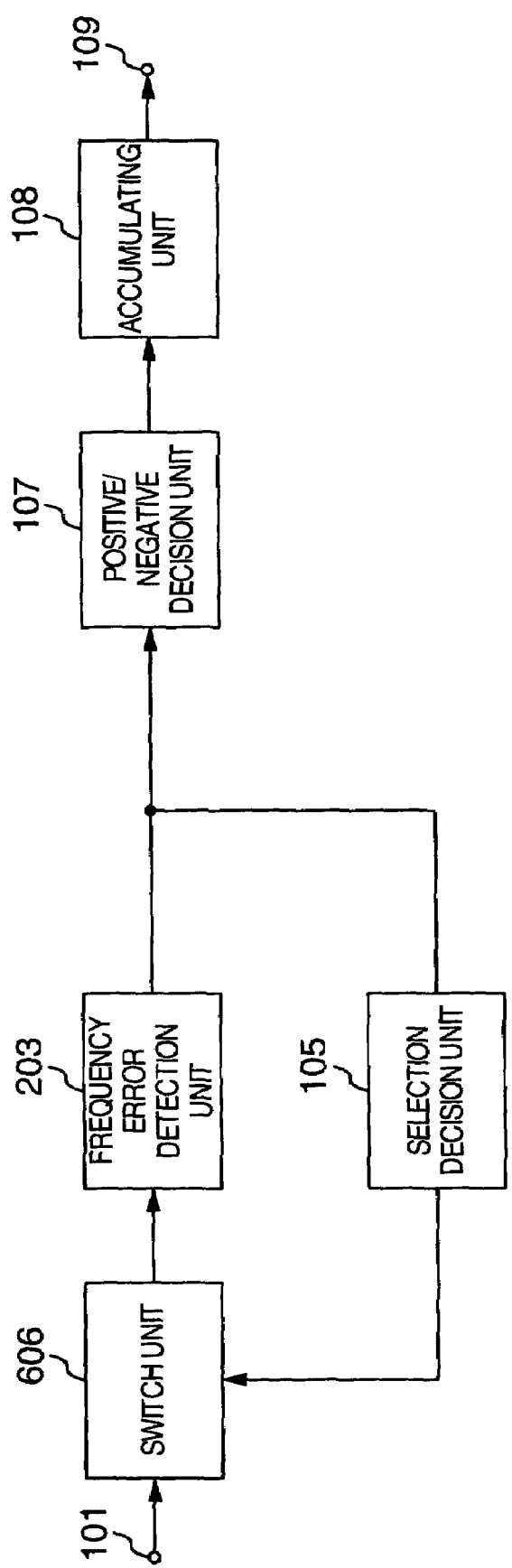
FIG. 9 is a block diagram showing another embodiment of the circuit for frequency control signal generation provided with the frequency error detection circuit according to the invention.

Referring now to FIG. 6E and FIG. 9, an example will be described in which both the first and second frequency error detection units 103 and 104 in FIG. 1 are implemented with a single frequency error detection unit 203. An example of internal construction of the frequency error detection unit 203 is illustrated in FIG. 6E. Internal construction and operation of a block 203 in FIG. 6E are the same as those of the block 103 in FIG. 6A and will not be described herein. The frequency error detection unit 203 of FIG. 6E differs from FIG. 6A in that a switch unit 606 for selecting the pilot signal and the first symbol of synchronous word symbol area is interposed between the buffer 311 and the input of frequency error detection unit 203. When the first synchronous word symbol of synchronous word symbol area is selected with the switch unit 606, the symbol distance between two input synchronous word symbols $x_1$ and $x_2$ is identical to that in the case of FIG. 6A and the same output as that of the first frequency error detection unit 103 can be obtained. On the other hand, when the pilot signal is selected by means of the switch unit 606, the symbol distance between two input synchronous word symbols $x_1$ and $x_2$ is identical to that in the case of FIG. 6B and the same output as that of the second frequency error detection unit 104 can be obtained. Accordingly, by transferring the switch unit 606, two frequency error signals $\phi_1$ and $\phi_2$ can be obtained.

Turning to FIG. 9, there is illustrated, in block diagram form, an embodiment of a frequency control signal generating apparatus using the frequency error detection unit 203. In FIG. 9, components other than the switch unit 606 and frequency error detection unit 203 are constructed identically to those in FIG. 1 and will not be described herein.

Referring now to FIGS. 10 and 11, embodiments of the base station radio apparatus and terminal station radio apparatus according to the invention will be described.

An example of construction of the base station radio apparatus is illustrated, in block diagram form, in FIG. 10. A shared send-receive unit 902 enables an antenna 901 to be used in common to transmitting and receiving operations. A receiving signal received by the antenna 901 is delivered to a receiving radio frequency circuit 302 (radio frequency circuit in FIG. 3) through the unit 902. The receiving radio frequency circuit 302 converts the frequency of the received signal in the form of a radio-frequency signal in radio band into an intermediate frequency capable of being sampled by an A/D converter 303 and the frequency-converted signal is converted into a digital signal by means of the A/D converter 303. An oscillator 310 supplies to the receiving radio frequency circuit 302 a signal of reference frequency which is used as a reference signal for the frequency conversion. The A/D converter 303 samples and quantizes the frequency-converted, received signal to convert it into a digital signal which in turn is delivered to a receiving demodulator 904. The receiving demodulator 904 demodulates the signal received from the A/D converter 303 and delivers demodulated data to a demodulated data output terminal 309.

A transmitting modulator 905 generates a baseband signal on the basis of data inputted from a modulation data input terminal 909 and the generated baseband signal is converted into an analog signal by a D/A converter 906. The analog signal is inputted to a transmitting radio frequency circuit 907 and the transmitting radio frequency circuit 907 converts the frequency of the signal in baseband zone received from the D/A converter 906 into a signal of radio frequency band which in turn is supplied to a power amplifier 908. The power amplifier 908 amplifies the power of the signal received from the transmitting radio frequency circuit 907 and delivers a resulting signal to the antenna 901 through the sharer 902.

The signal outputted from the oscillator 310 is inputted to both the receiving radio frequency circuit 302 and the transmitting radio frequency circuit 907.

The receiving demodulator 904 and transmitting modulator 905 are processed by a DSP (Digital Signal Processor) 903 and software for controlling the same.

Turning to FIG. 11, an example of construction of the terminal station radio apparatus is illustrated in block form. Excepting a voltage controlled oscillator 403 and a D/A converter 402, the FIG. 11 apparatus is structurally identical to the base station apparatus of FIG. 10. In the terminal station radio apparatus in FIG. 11, a frequency error of a receiving signal is detected inside a receiving demodulator 1001 and the voltage controlled oscillator 403 is controlled through the D/A converter 402 so as to make the error small. An output signal of the voltage controlled oscillator 403 is supplied to both the receiving radio frequency circuit 302 and the transmitting radio frequency circuit 907 and therefore, in the terminal station radio apparatus, the frequency of a transmitting signal can be controlled so as to follow the frequency error detected from the receiving signal delivered out of the base station.

According to the invention, the automatic frequency control method can be obtained which can control frequency errors in the wide range and can reduce the frequency error.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An automatic frequency control signal generating circuit comprising:
   a first frequency error detection unit for extracting from an input signal at least two known different symbols as a first symbol set, detecting a first frequency error of said input signal based on said extracted first symbol set, and delivering said first frequency error;
   a second frequency error detection unit for extracting from said input signal at least two known symbols having a symbol distance different from that of said first symbol set as a second symbol set, detecting a second frequency error of said input signal based on said extracted second symbol set and delivering said second frequency error;
   a decision unit for deciding which one of the first and second frequency errors of said first and second frequency error detection units is selected; and
   a control signal unit for generating a control signal adapted to control the frequency of said input signal based on said one of the first and second frequency errors of said first and second frequency error detection units selected by said decision unit.

2. An automatic frequency control signal generating circuit according to claim 1, wherein said control signal unit includes:
   a positive/negative decision unit for deciding whether the first or second frequency errors of said first or second frequency error detection units selected by said decision unit is a positive value or a negative value and delivering a result of a decision by said position/negative decision unit; and an accumulating unit for accumulating the result delivered out of said positive/negative decision unit and delivering an integrated signal as said control signal.

3. An automatic frequency control signal generating circuit according to claim 2, wherein said decision unit compares a predetermined reference value with an absolute value of the output of said first frequency error detection unit and effects detection of the first or the second frequency errors of one of said first or second frequency error selection units in accordance with a comparison result.

4. An automatic frequency control signal generating circuit according to claim 3, wherein a frame format of said input signal includes a known pilot signal, a data area of predetermined symbol length and a known synchronous word symbol area of predetermined symbol length, wherein said first frequency error detection unit extracts at least two synchronous word symbols in said synchronous word symbol area, and said second frequency error detection unit extracts said pilot signal and a synchronous word symbol in said synchronous word symbol area.

5. An automatic frequency control signal generating circuit according to claim 1, wherein said first frequency error detection unit includes:

a first multiplier for calculating and delivering a product of one symbol of said first symbol set and a complex conjugate of said symbol;

a first complex conjugate unit for inverting and conducting a complex generating and outputting a phase of the product delivered said first multiplier, a second multiplier for calculating and delivering a product of another symbol of said first symbol set and a complex conjugate of said another symbol, a third multiplier for performing complex multiplication of the output of said first complex conjugate circuit and the product delivered said second multiplier and delivering a first complex product, and a first phase detection unit for detecting the phase of the output of said third multiplier and delivering said detected phase as said first frequency error and wherein said second frequency error detection unit includes:

a fourth multiplier for calculating and delivering a product of one symbol of said second symbol set and a complex conjugate of said symbol of the second symbol set, a second complex conjugate unit for inverting and conducting a generating and outputting a phase of the product delivered by said fourth multiplier, a fifth complex multiplier for calculating and delivering a product of another symbol of said second symbol set and a complex conjugate of said another symbol of said second symbol set, a sixth multiplier for performing complex multiplication of the output of said second complex conjugate unit and the product delivered by said fifth complex multiplier and delivering a second complex product, and a second phase detection unit for detecting the phase of the output of said sixth complex multiplier and delivering said detected phase as said second frequency error.

6. An automatic frequency control signal generating circuit according to claim 5, wherein one symbol of said first symbol set input to said first multiplier and another symbol of said first symbol set input to said second multiplier are located at positions which are distant from each other by n symbols in said input signal, where n is a power of 2.

7. An automatic frequency control signal generating circuit according to claim 5, wherein a frame format of said input signal includes a data area of predetermined symbol length and a known synchronous word symbol area of predetermined symbol length, one symbol of said first symbol set inputted to said first multiplier is an initial synchronous word symbol of said synchronous word symbol area, another symbol of said first symbol set inputted to said second multiplier is one synchronous word symbol selected from a second and ensuing synchronous word symbols of said synchronous word symbol area, and said first frequency error detection unit further includes a switch unit for selecting and delivering one desired synchronous word symbol from the second and ensuing synchronous word symbols of said synchronous word symbol area of said input signal.

8. An automatic frequency control signal generating circuit according to claim 7, wherein one symbol to be selected from the second and ensuing synchronous word symbols by means of said switch unit is located at a position which is distant from said initial synchronous word symbol by n symbols, where n is a power of 2.

9. An apparatus for receiving signals having the automatic frequency control signal generating circuit as recited in claim 1, further comprising:

an RF receiving circuit for performing frequency conversion of a received signal, converting the received signal subjected to the frequency conversion into a digital signal and delivering it;

an oscillator for delivering to said RF receiving circuit a reference frequency signal for the frequency conversion;

a quadrature detector for converting the received signal subjected to the digital conversion into a baseband signal and delivering it;

a filter for eliminating unwanted frequency components of the received baseband signal and delivering a resulting signal;

a frequency corrector for correcting an error between the frequency of the baseband signal delivered out of said filter and the frequency of said reference frequency signal on the basis of said control signal from said automatic frequency control signal generating circuit and delivering a corrected baseband signal;

a demodulator for demodulating and delivering the baseband signal received from said frequency corrector; and a buffer for holding the corrected baseband signal output of said frequency corrector, wherein said automatic frequency control signal generating circuit extracts said first and second symbol sets from said input signal now represented by the corrected baseband signal held in said buffer and generates said control signal on the basis of said symbol sets to supply said control signal to said frequency corrector.

10. A radio base station apparatus comprising:

the receiving apparatus as recited in claim 9, further comprising:

a radio transmitting circuit for converting a signal of baseband zone to be transmitted, which signal is converted to an analog signal, into a signal of radio frequency band based on the reference frequency signal of said oscillator.

11. A radio transmitting/receiving system comprising:

the radio base station as recited in claim 10, further comprising:

at least one mobile radio transmitting/receiving apparatus, wherein said at least one mobile radio transmitting/receiving apparatus receives a transmitting signal from said radio base station and controls a reference frequency signal inside said mobile radio transmitting/receiving apparatus based on a reference frequency signal extracted from said received signal.

12. An apparatus for receiving signals having the automatic frequency control signal generating circuit as recited in claim 1, further comprising:

an RF receiving circuit for performing frequency conversion of a received signal, converting the received signal subjected to the frequency conversion into a digital signal and delivering the received signal;

an oscillator for delivering to said RF receiving circuit a reference frequency signal for the frequency conversion;

a quadrature detector for converting the received signal subjected to digital conversion into a baseband signal and delivering it;

a filter for eliminating unwanted frequency components from the received baseband signal and delivering a resulting signal;

a demodulator for demodulating and delivering the baseband signal received from said filter; and a buffer for holding the output of said filter, wherein said automatic frequency control signal generating circuit extracts said first and second symbol sets from said input signal now represented by the signal held in said buffer and generates said control signal based on said symbol sets, and said receiving apparatus further includes a frequency controller for controlling said reference frequency signal of said oscillator based on said control signal from said automatic frequency control signal generating circuit.

13. A radio terminal apparatus comprising:

the receiving apparatus as recited in claim 12, further comprising:

a radio transmitting circuit for converting a signal of baseband zone to be transmitted, which signal is converted into an analog signal, into a signal of radio frequency band based on the reference frequency signal of said oscillator.

14. A frequency error detection method comprising the steps of:

a) extracting at least two known different symbols as a first symbol set from an input signal;

b) calculating and delivering a product of one symbol of said first symbol set and a complex conjugate of said symbol;

c) generating and delivering a phase of the product calculated in said step b);

d) calculating and delivering a second product of another symbol of said first symbol set and a complex conjugate of said another symbol of said first symbol set;

e) performing complex multiplication of the phase of the product calculated in step c) and the second product calculated in step d) and delivering a third product; and f) detecting the phase of the third product calculated in step e) and delivering said detected phase as a first frequency error of said input signal.

15. A frequency error detection method according to claim 14, wherein one symbol of said first symbol set in said step b) and another symbol in said first symbol set in said step d) are located at positions which are distant from each other by n symbols inside said input signal, where n is a power of 2.

16. A frequency error detection method according to claim 14, wherein when a frame format of said input signal includes a data area of predetermined symbol length and a known synchronous word symbol area of predetermined symbol length, one symbol of said first symbol set in said step b) is an initial synchronous word symbol of said synchronous word symbol area and another symbol of said first symbol set in said step d) is one synchronous word symbol desirably selected from the second and ensuing synchronous word symbols of said synchronous word symbol area.

17. A frequency error detection method according to claim 14 further comprising the steps of:

g) extracting, as a second symbol set, at least two known symbols having a different symbol distance from that in said first symbol set from said input signal;

h) calculating and delivering a fourth product of one symbol of said second symbol set and a complex conjugate of said symbol of said second symbol set;

i) generating and delivering a phase of the fourth product delivered in said step h);

j) calculating and delivering a fifth product of another symbol of said second symbol set and a complex conjugate of said symbol of said second symbol set;

k) performing complex multiplication of the phase of the fourth product and the fifth product and delivering a sixth product;

l) detecting a phase of sixth product calculated in said step k) and delivering said detected phase as a second frequency error of said input signal; and m) selecting any one of said first and second frequency errors on the basis of a predetermined condition.

18. A frequency error detection method according to claim 17, wherein when said first frequency error is $\phi1$, said second frequency error is $\phi2$ and a positive reference value preset desirably is $\phi\text{th}$, said step m) further includes a step of selecting said second frequency error $\phi2$ if an absolute value $|\phi1|$ of said first frequency error $\phi1$ satisfies $|\phi1| \leq \phi\text{th}$ but selecting said first frequency error $\phi1$ satisfies $|\phi1| > \phi\text{th}$.

19. A method for receiving signals having the steps a) to m) as recited in claim 18, further comprising the steps of:

n) performing frequency conversion of a received signal, converting the received signal subjected to the frequency conversion into a digital signal and delivering it;

o) delivering a reference frequency signal for said frequency conversion in said step n);

p) a step of converting the received signal subjected to digital conversion into a baseband signal, applying quadrature detection on the converted baseband signal, and then outputting the detected baseband signal;

q) eliminating unwanted frequency components from the delivered baseband signal;

r) correcting an error between the frequency of the baseband signal delivered in said step q) and the frequency of said reference frequency signal based on the frequency error signal delivered in said step m) and delivering a corrected baseband signal;

s) demodulating and delivering the output of the corrected baseband signal in said step r); and t) holding the output in said step s), wherein the extraction of said first and second symbol sets in said steps a) and g) is carried out from the signal held in said step t).

20. A method for transmitting and receiving signals having the steps a) to t) as recited in claim 19, further comprising the step of:

converting a signal of baseband zone to be transmitted, which signal is converted into an analog signal, into a signal of radio frequency band on the basis of said reference frequency signal and transmitting the converted radio frequency band signal.

21. An automatic frequency control signal generating circuit comprising:

a frequency error detection unit for extracting at least two known different symbols as a first symbol set from an input signal, further extracting, as a second symbol set, at least two known symbols having a different symbol distance from that of said first symbol set from said input signal, detecting first and second frequency errors of said input signal based on said extracted first and second symbol sets and delivering them;

a decision unit for deciding as to which one of said first and second frequency errors is selected in accordance with values of said first and second frequency errors; and a control signal unit for generating a control signal adapted to control the frequency of said input signal based on the first or second frequency error selected by said decision unit.

22. An automatic frequency control signal generating circuit according to claim 21, wherein when a frame format of said input signal includes a known pilot signal, a data area of predetermined symbol length and a known synchronous word symbol area of predetermined symbol length, said first symbol set includes said pilot signal and one synchronous word symbol in the synchronous word symbol area and said second symbol set includes two synchronous word symbols in said synchronous word symbol area, wherein said frequency error detection unit further includes:

a switch unit for selecting and delivering any one of the pilot signal or one synchronous word symbol of said synchronous word symbol area in one frame of said input signal;

a first multiplier for calculating and delivering a first product of the symbol delivered by said switch unit and a complex conjugate of said symbol;

a complex conjugate unit for generating and delivering a phase of the first product delivered out of said first multiplier;

a second multiplier for calculating and delivering a second product of another synchronous word symbol of said synchronous word symbol area and a complex conjugate of said another synchronous word symbol of said synchronous word symbol area;

a third multiplier for performing complex multiplication of the phase generated by said complex conjugate unit and the second product calculated by said second multiplier and delivering a third product; and a phase detection unit for detecting a phase of the third product calculated by said third multiplier and delivering the detected phase as said first or second frequency error, and wherein the phase detected by said phase detection unit when said switch selects said pilot signal is made to be said first frequency error and the phase detected by said phase detection unit when said switch unit selects one synchronous word symbol of said synchronous word symbol area is made to be said second frequency error.

* * * * *